RAYMOND L. KING JR.
ROBERT L. CONGER
INVENTORS

United States Patent Office 3,495,080
Patented Feb. 10, 1970

3,495,080
HIGH SPEED ANALOG MULTIPLIER USING PHOTOCELLS IN CONJUNCTION WITH NEON AND ARGON TUBES
Raymond L. King, Jr., and Robert L. Conger, Riverside, Calif., assignors to the United States of America as represented by the Secretary of the Navy
Filed Oct. 24, 1967, Ser. No. 677,796
Int. Cl. G06g 9/00, 7/16
U.S. Cl. 235—194     5 Claims

ABSTRACT OF THE DISCLOSURE

A high-speed analog multiplier using photomultiplier tubes in conjunction with neon and argon tubes which produces a current proportional to the applied voltage squared over a considerable voltage range.

The invention herein described may be manufactured and used by or for the Government of the United States of America for governmental purposes without the payment of any royalties thereon or therefor.

An important application of analog computers is in the solution of nonlinear differential equations such as the typical one shown here, which appears in the theory of the scattering of spin waves by R. Conger, J. Appl. Phys., vol. 32, p. 1525 (1961):

$$\frac{d^2x}{dt^2} + k \times \frac{dx}{dt} + \omega_0^2 x = A \cos \omega t. \quad (1)$$

It will be noted that the nonlinear term of Equation 1 has an absolute value component. Absolute values are frequently encontered in non-linear differential equations, for example, damping may be proportional to velocity raised to some power, but the damping magnitude is not usually a function of velocity direction. It is convenient to have a unit which will take the absolute value of one variable and multiply it by another variable. The nonlinear multiplying circuit of this invention has this capability.

In an analog computer, the linear operations that are performed on the amplifiers with resistors and capacitors in feedback networks are sufficiently fast. Most multipliers and other nonlinear components, however, are too slow. The electromagnets used in magnetoresistance and Hall-effect multipliers to produce the large fields required limit the speed of operation of these devices.

A high-speed multiplier that makes use of photomultiplier tubes is the primary object of this invention. The current through the photomultiplier tube is a function of both the light striking the tube and the voltage applied across the tube. The light striking the tube in turn is a function of the voltage applied to a light source. In the present invention argon and neon tubes are used for the light source. Unlike blackbody light sources, the spectrum of the light from these tubes is almost independent of the input power and there is no continuous glow produced when an alternating potential is applied to the tube.

Figure 1:
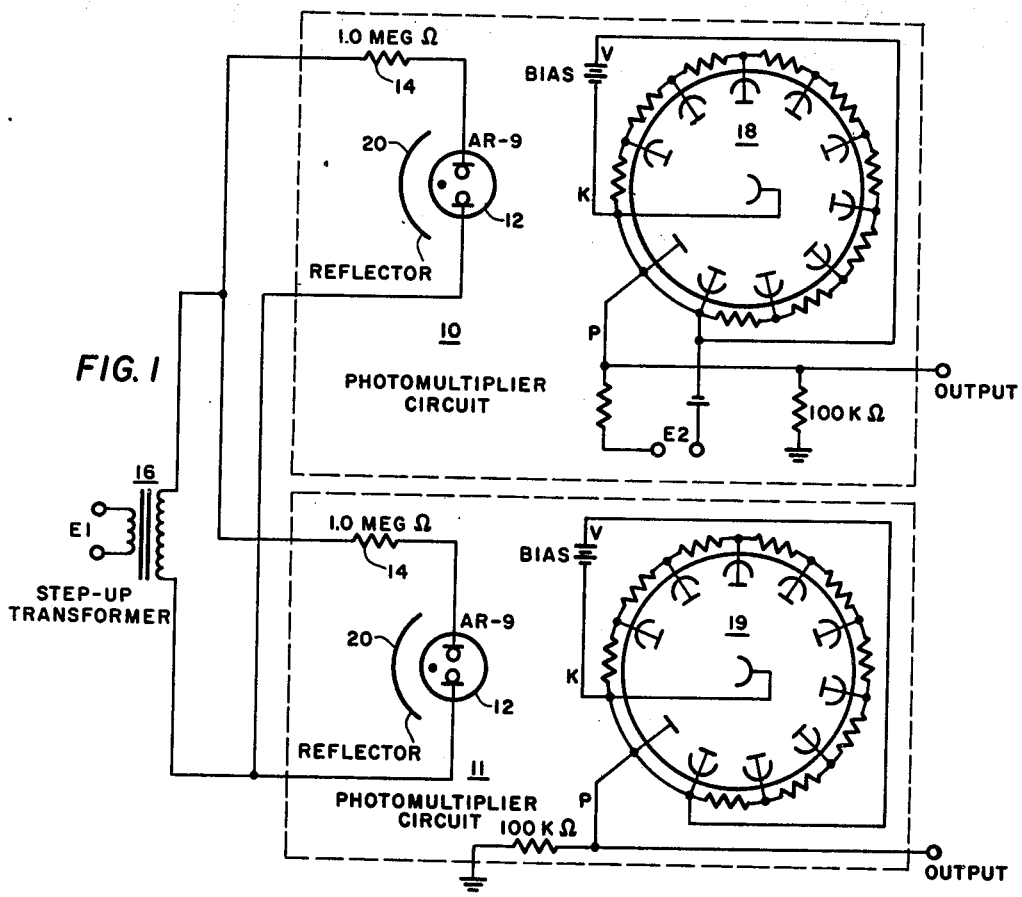
FIG. 1 is a circuit diagram of the basic circuitry for a preferred embodiment of the multiplier of the instant invention.

In photomultiplier circuits 10 and 11 of the high-speed multiplier as shown in FIG. 1, the gas tube 12 is connected in series with a resistance 14, of 1.0 megohm for example to the secondary of a step-up transformer 16.

After gas tube 12 fires at a potential cross the tube of about 70 v., for example, the potential across the tube is constant. The voltage across the series combination of resistor 14 and gas tube 12, if considerably higher than 70 v., will be predominantly across the resistor, and the current flowing through the resistor and tube will be proportional to the applied voltage. The power delivered to gas tube 12, therefore, will be proportional to the voltage applied to the resistor and tube combination rather than to the voltage squared, as would be the case if the resistor were not there. Thus, if the output voltage from the secondary of transformer 16 is large compared to the firing voltage of gas tube 12, the light output from gas tube 12 will be proportional to this voltage. The light from the gas tube is independent of the polarity applied to the tube; therefore if the output of transformer 16 is a sine wave, the light from the gas tube 12 will be a rectified sine wave.

The photomultiplier tubes 18 and 19 (e.g., type 1P28) must have a frequency response high enough to respond to all the significant harmonics of the input waveform. It has been found that when the input to transformer 16 is a 100 c.p.s. since wave, PbS cells, cadmium sulfide cells, and the like do not have sufficient frequency response. A gas-filled phototube is adequate with 100 c.p.s. sine wave input, but is not adequate for a 1 kc. input, for example, as are photomultiplier tubes 18 and 19. Vacuum phototubes have sufficient frequency response, but do not have the sensitivity to respond to the very small neon and argon gas tubes 12 used.

The current through photomultiplier tubes 18 and 19 is directly proportional to the light striking the tube, but is not directly proportional to the voltage applied across the tube. For a given light intensity, the current through the tube is approximately proportional to the applied voltage squared over a considerable voltage range. To obtain approximately linear operation, tube is biased with a voltage of about 500 v., for example. The second input, $E_2$, to photomultiplier tube 18 is a perturbation applied to this bias voltage. So long as this perturbation is small compared to the bias voltage, the change in current through photomultiplier tube 18 will be approximately proportional to this perturbation voltage, $E_2$. $E_1$, the signal applied to the primary of transformer 16 and $E_2$ are the two signals to be multiplied.

Since a bias voltage is present, there will be an output of the photomultiplier proportional to the bias voltage when no multiplying voltage, $E_2$, is applied as a perturbation. To remove this undesired quantity, two photomultiplier circuits 10 and 11 are used, each with an argon tube 12 and a resistor 14. The two argon tubes with their current-limiting resistors 14 are driven in parallel by the high voltage step-up transformer 16. Each photomultiplier tube 18 and 19 has the same bias voltage, but the perturbation signal $E_2$ is applied to only one, i.e., cricuit 10. By substracting the two outputs, the signal produced by the bias voltage is removed. When a signal $E_1$ is applied to the input of step-up transformer 16 and a perturbation voltage $E_2$ applied to photomultiplier tube 18, the difference of the outputs of circuits 10 and 11 is proportional to the product of the two signals. In this manner, multiplication is obtained.

To prevent electrical pickup from the argon tube circuit from affecting the photomultiplier tube circuit a shield can be used and light from gas tube 12 striking the photomultiplier tube 18 can be passed through a wire screen for further shielding. A reflector 20 behind gas tube 12 can be used to direct light toward the photomultiplier tubes 18 and 19.

Figure 2:
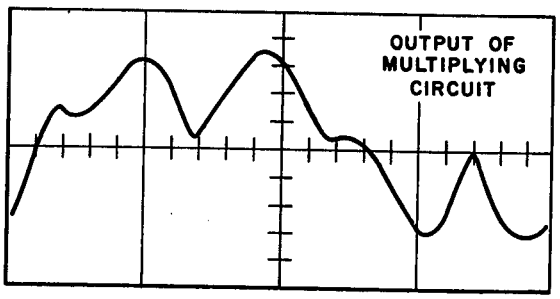
FIG. 2 shows the actual output of the multiplying circuit as observed on an oscilloscope.
Figure 3:
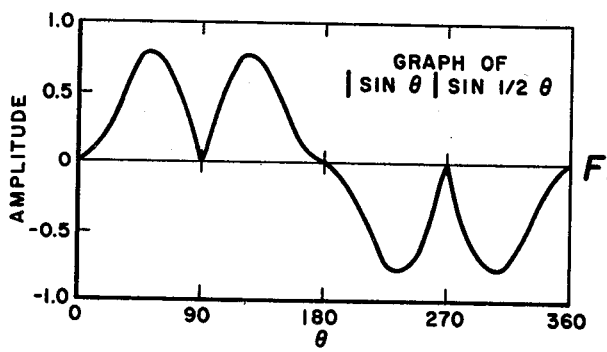
FIG. 3 is a graph of the calculated output of the multiplier.

FIG. 2 is the output of the multiplier as observed on an oscilloscope. The oscilloscope used had a plug-in attachment which had a differential amplifier; thus the substraction of the two signals could be made at the oscilloscope. The outputs of the two photomultiplier circuits 10 and 11 were first balanced to approximately zero with no perturbation input signal $E_2$. The signal $E_2$ was then applied to tube 18 to produce the output shown in FIG. 2. In this case, $E_1$ and $E_2$, the two signals to the multiplier, were, respectively, 1000 and 500 c.p.s. sine waves. The output should be the product of the rectified sine wave and another sine wave at half the frequency, as shown in the calculated curve of FIG. 3. Comparison of FIGS. 2 and 3 shows that the multiplier is performing as it should.

The voltage applied to the gas tube 12 and current limiter 14 must be large compared to 70 v.; but although the voltage must be large, the power need not be. If the current-limiting resistor 14 in series with the argon gas tubes 12 has a resistance of $10^6$ ohms and if the output voltage is $2 \times 10^3$ v., the current through the argon tube and resistor will be only $2 \times 10^{-3}$ A. If step-up transformer 16 has a 100-to-1 turns ratio, the input voltage will be 20 v. Since the ratio of input to output impedance will be $10^4$, the input impedance will be $10^2$ ohms. The power will be 4.0 W, which is easy to obtain at 1000 ohms impedance.

Obviously many modifications and variations of the present invention are possible in the light of the above teachings. It is therefore to be understood that within the scope of the appended claims the invention may be practiced otherwise than as specifically described.

What is claimed is:

1. A high-speed analog multiplier for multiplying two voltages comprising:
    (a) a step-up transformer to which the first of the voltages to be multiplied is applied to the primary thereof,
    (b) two photomultiplier circuits connected in parallel across the secondary of said step-up transformer,
    (c) each of said photomultiplier circuits comprising:
        (1) a light source whose light intensity output is proportional to the transformer output,
        (2) a photomultiplier means, the current through which is directly proportional to the light striking it from said light source,
    (d) each said light source being a gas tube in series with a current limiting resistance, and the voltage from said transformer applied across the combination of gas tube and resistance being predominantly across the resistance such that the power delivered to the gas tube is proportional to the voltage applied to the combination rather than the voltage squared, the light from each said gas tube being independent of the polarity applied thereto,
    (e) each said photomultiplier means being a photomultiplier tube, each having the same bias voltage,
    (f) the second of the voltages to be multiplied being applied to one of the photomultiplier means and the change in current therethrough being proportional to said second voltage,
    (g) the difference in the outputs of said two photomultplier means being proportional to the product of the two voltages to be multiplied.

2. A device as in claim 1 wherein said gas tube is an argon tube.

3. A device as in claim 1 wherein said gas tube is a neon tube.

4. A device as in claim 1 wherein means is provided for directing light from each said light source toward respective photomultiplier means.

5. A device as in claim 1 wherein said photomultiplier means is shielded from extraneous electrical pickup.

References Cited

UNITED STATES PATENTS

| | | |
|---|---|---|
| 3,110,813 | 11/1963 | Sack. |
| 3,193,672 | 7/1965 | Azgapetian _____ 235—194 |
| 3,215,824 | 11/1965 | Alexander et al. __ 235—194 X |
| 3,283,135 | 11/1966 | Sklaroff _____ 235—194 |

MALCOLM A. MORRISON, Primary Examiner

JOSEPH F. RUGGIERO, Assistant Examiner

U.S. Cl. X.R.

250—206